(12) United States Patent
Hartenstein

(10) Patent No.: US 8,184,062 B2
(45) Date of Patent: May 22, 2012

(54) WIRELESS LOCAL AREA NETWORK ANTENNA ARRAY

(75) Inventor: Abraham Hartenstein, Chatsworth, CA (US)

(73) Assignee: Xirrus, Inc., Thousand Oaks, CA (US)

( * ) Notice: Subject to any disclaimer, the term of this patent is extended or adjusted under 35 U.S.C. 154(b) by 831 days.

(21) Appl. No.: 11/816,064

(22) PCT Filed: Mar. 9, 2006

(86) PCT No.: PCT/US2006/008747
§ 371 (c)(1),
(2), (4) Date: Apr. 3, 2008

(87) PCT Pub. No.: WO2006/096866
PCT Pub. Date: Sep. 14, 2006

(65) Prior Publication Data
US 2008/0267151 A1    Oct. 30, 2008

Related U.S. Application Data

(60) Provisional application No. 60/660,171, filed on Mar. 9, 2005, provisional application No. 60/660,276, filed on Mar. 9, 2005, provisional application No. 60/660,375, filed on Mar. 9, 2005, provisional application No. 60/660,275, filed on Mar. 9, 2005, provisional application No. 60/660,210, filed on Mar. 9, 2005, provisional application No. 60/660,174, filed on Mar. 9, 2005, provisional application No. 60/660,394, filed on Mar. 9, 2005, provisional application No. 60/660,209, filed on Mar. 9, 2005, provisional application No. 60/660,393, filed on Mar. 9, 2005, provisional application No. 60/660,269, filed on Mar. 9, 2005, provisional application No. 60/660,392, filed on Mar. 9, 2005, provisional application No. 60/660,391, filed on Mar. 9, 2005, provisional application No. 60/660,277, filed on Mar. 9, 2005, provisional application No. 60/660,302, filed on Mar. 9, 2005, provisional application No. 60/660,376, filed on Mar. 9, 2005, provisional application No. 60/660,541, filed on Mar. 9, 2005.

(51) Int. Cl.
    *H01Q 21/20* (2006.01)
(52) U.S. Cl. .................................. 343/799; 343/815
(58) Field of Classification Search .................. 343/793, 343/872, 873, 878, 879, 797, 798, 799, 810, 343/815
See application file for complete search history.

(56) References Cited

U.S. PATENT DOCUMENTS

| | | | |
|---|---|---|---|
| 4,042,935 A * | 8/1977 | Ajioka et al. ................. | 343/795 |
| 4,649,391 A * | 3/1987 | Tsuda et al. .................. | 342/153 |
| 4,726,050 A | 2/1988 | Menich et al. | |
| 5,389,941 A * | 2/1995 | Yu ................................ | 343/797 |
| 5,952,983 A | 9/1999 | Dearnley et al. | |
| 6,140,972 A | 10/2000 | Johnston et al. | |
| 6,157,811 A | 12/2000 | Dent | |
| 6,326,926 B1 | 12/2001 | Schoobridge et al. | |
| 6,329,954 B1 * | 12/2001 | Fuchs et al. .................. | 343/725 |
| 6,374,078 B1 | 4/2002 | Williams et al. | |
| 6,452,565 B1 * | 9/2002 | Kingsley et al. ............. | 343/873 |
| 6,539,204 B1 | 3/2003 | Marsh et al. | |
| 6,544,173 B2 | 4/2003 | West et al. | |

(Continued)

*Primary Examiner* — Hoanganh Le
(74) *Attorney, Agent, or Firm* — The Eclipse Group LLP

(57) ABSTRACT

A wireless local area network ("WLAN") antenna array ("WLANAA") is disclosed. The WLANAA may include a circular housing having a plurality of radial sectors and a plurality of primary antenna elements. Each individual primary antenna element of the plurality of primary antenna elements may be positioned within an individual radial sector of the plurality of radial sectors.

10 Claims, 18 Drawing Sheets

U.S. PATENT DOCUMENTS

| | | |
|---|---|---|
| 6,606,059 B1 | 8/2003 | Barabash |
| 6,646,611 B2 * | 11/2003 | Plet et al. ................... 343/702 |
| 6,888,504 B2 | 5/2005 | Chang et al. |
| 6,903,703 B2 * | 6/2005 | Durham et al. ............... 343/795 |
| 6,933,909 B2 | 8/2005 | Theobold |
| 7,057,566 B2 | 6/2006 | Theobold et al. |
| 7,103,386 B2 | 9/2006 | Hoffmann et al. |
| 7,119,744 B2 | 10/2006 | Theobold et al. |
| 7,193,562 B2 | 3/2007 | Shtrom et al. |
| 7,202,824 B1 | 4/2007 | Sanelli et al. |
| 7,253,783 B2 | 8/2007 | Chiang et al. |
| 7,274,944 B2 | 9/2007 | Lastinger et al. |
| 7,292,198 B2 | 11/2007 | Shtrom et al. |
| 7,358,912 B1 | 4/2008 | Kish et al. |
| 7,362,280 B2 | 4/2008 | Kish et al. |
| 7,496,070 B2 | 2/2009 | Vesuna |
| 7,498,996 B2 | 3/2009 | Kish et al. |
| 7,498,999 B2 | 3/2009 | Shtrom |
| 7,505,447 B2 | 3/2009 | Kish et al. |
| 7,511,680 B2 | 3/2009 | Kish et al. |
| 7,525,486 B2 | 4/2009 | Shtrom et al. |
| 7,567,213 B2 * | 7/2009 | Liu ............................. 343/853 |
| 7,646,343 B2 | 1/2010 | Shtrom et al. |
| 7,652,632 B2 | 1/2010 | Shtrom |
| 7,675,474 B2 | 3/2010 | Shtrom et al. |
| 7,696,946 B2 | 4/2010 | Shtrom |
| 7,787,436 B2 | 8/2010 | Kish et al. |
| 7,864,119 B2 | 1/2011 | Shtrom et al. |
| 8,078,194 B2 | 12/2011 | Walley et al. |
| 2001/0033600 A1 | 10/2001 | Yang et al. |
| 2002/0039082 A1 | 4/2002 | Fox et al. |
| 2002/0163933 A1 | 11/2002 | Benveniste |
| 2002/0186678 A1 | 12/2002 | Averbuch et al. |
| 2003/0040319 A1 | 2/2003 | Hansen et al. |
| 2003/0210193 A1 | 11/2003 | Rossman et al. |
| 2004/0001429 A1 | 1/2004 | Ma et al. |
| 2004/0005227 A1 | 1/2004 | Cremer et al. |
| 2004/0052227 A1 | 3/2004 | Judd et al. |
| 2004/0066326 A1 | 4/2004 | Knapp |
| 2004/0102222 A1 | 5/2004 | Skafidas et al. |
| 2004/0105412 A1 | 6/2004 | He et al. |
| 2004/0143681 A1 | 7/2004 | Benveniste |
| 2004/0157551 A1 | 8/2004 | Gainey et al. |
| 2004/0196813 A1 | 10/2004 | Ofek et al. |
| 2004/0203347 A1 | 10/2004 | Nguyen |
| 2004/0224637 A1 | 11/2004 | Silva et al. |
| 2004/0240424 A1 | 12/2004 | Fong et al. |
| 2004/0242274 A1 | 12/2004 | Corbett et al. |
| 2004/0259558 A1 | 12/2004 | Skafidas et al. |
| 2004/0259563 A1 | 12/2004 | Morton et al. |
| 2005/0020299 A1 | 1/2005 | Malone et al. |
| 2005/0025254 A1 | 2/2005 | Awad et al. |
| 2005/0035919 A1 * | 2/2005 | Yang et al. ................... 343/795 |
| 2005/0058097 A1 | 3/2005 | Kang et al. |
| 2005/0058111 A1 | 3/2005 | Hung et al. |
| 2005/0237258 A1 | 10/2005 | Abramov et al. |
| 2005/0254470 A1 | 11/2005 | Yashar |
| 2005/0255892 A1 | 11/2005 | Wong et al. |
| 2006/0038738 A1 | 2/2006 | Shtrom |
| 2006/0098616 A1 | 5/2006 | Kish et al. |
| 2006/0109799 A1 | 5/2006 | Tseng et al. |
| 2006/0233280 A1 | 10/2006 | Tynderfeldt et al. |
| 2007/0066234 A1 | 3/2007 | Lastinger et al. |
| 2007/0178927 A1 | 8/2007 | Fernandez-Corbaton et al. |
| 2007/0210974 A1 | 9/2007 | Chiang |
| 2007/0293178 A1 | 12/2007 | Milton et al. |
| 2008/0136715 A1 | 6/2008 | Shtrom et al. |
| 2008/0137681 A1 | 6/2008 | Kish et al. |
| 2008/0221918 A1 | 9/2008 | Petersen et al. |
| 2008/0225814 A1 | 9/2008 | Thermond et al. |
| 2008/0267151 A1 | 10/2008 | Hartenstein |
| 2008/0268778 A1 | 10/2008 | De La Garrigue et al. |
| 2008/0274748 A1 | 11/2008 | Lastinger et al. |
| 2008/0291098 A1 | 11/2008 | Kish et al. |
| 2009/0028095 A1 | 1/2009 | Kish |
| 2009/0075606 A1 | 3/2009 | Shtrom et al. |
| 2010/0053010 A1 | 3/2010 | Shtrom et al. |
| 2010/0053023 A1 | 3/2010 | Shtrom et al. |
| 2010/0103065 A1 | 4/2010 | Shtrom et al. |
| 2010/0103066 A1 | 4/2010 | Shtrom et al. |
| 2010/0119002 A1 | 5/2010 | Hartenstein |

\* cited by examiner

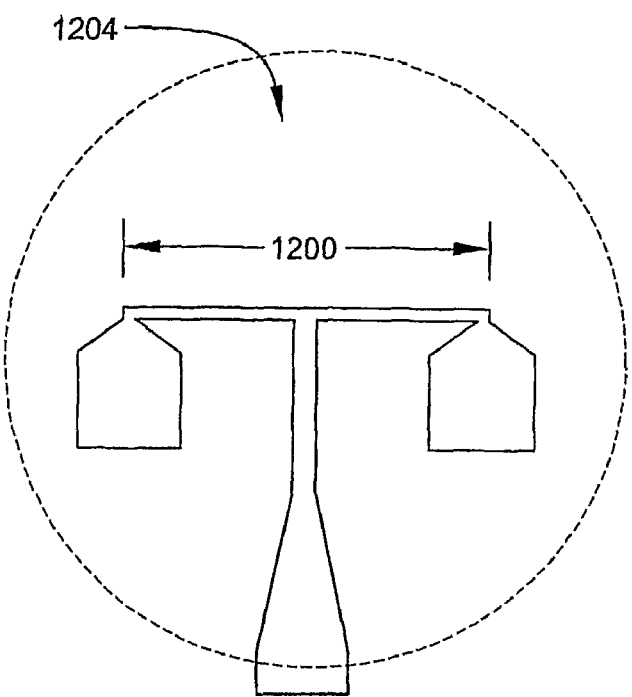
Fig. 12A
Fig. 12B
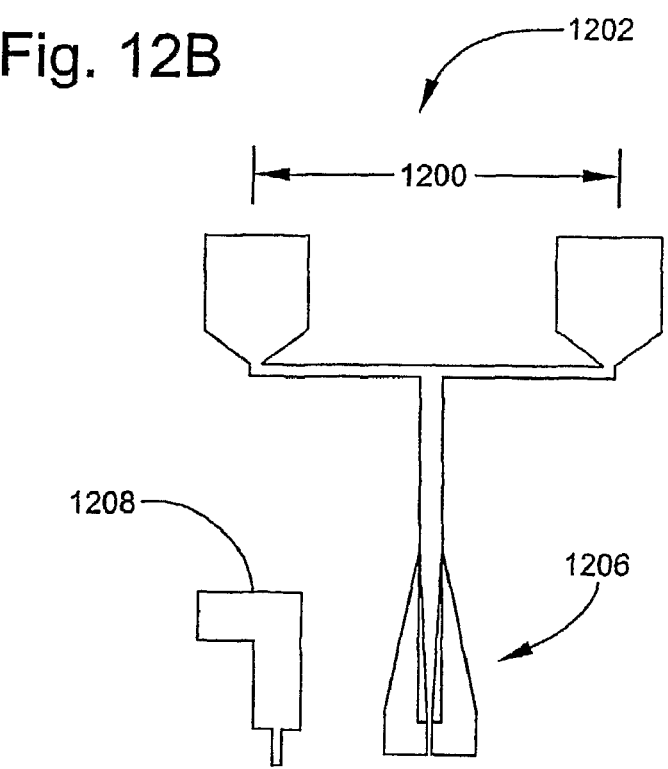

WIRELESS LOCAL AREA NETWORK ANTENNA ARRAY

CROSS-REFERENCE TO RELATED APPLICATIONS

This application claims priority to the provisional patent applications, Ser. No. 60/660,171, titled "Wireless LAN Array," by Dirk I. Gates, Ian Laity, Mick Conley, Mike de la Garrigue, and Steve Smith, filed on Mar. 9, 2005, and incorporated herein by reference; Ser. No. 60/660,276, titled "Wireless LAN Array," by Dirk I. Gates, Ian Laity, Mick Conley, Mike de la Garrigue, and Steve Smith, filed on Mar. 9, 2005, and incorporated herein by reference; Ser. No. 60/660,375, titled "Wireless Access Point," by Dirk I. Gates and Ian Laity, filed on Mar. 9, 2005, and incorporated herein by reference; Ser. No. 60/660,275, titled "Multi-Sector Access Point Array," by Dirk I Gates Ian Laity, Mick Conley, Mike de la Garrigue, and Steve Smith, filed on Mar. 9, 2005, and incorporated herein by reference; Ser. No. 60/660,210, titled "Media Access Controller For Use In A Multi-Sector Access Point Array," by Mike de la Garrigue and Drew Bertagna filed on Mar. 9, 2005, and incorporated herein by reference; Ser. No. 60/660,174, titled "Queue Management Controller For Use In A Multi-Sector Access Point Array," by Mike de la Garrigue and Drew Bertagna filed on Mar. 9, 2005, and incorporated herein by reference; Ser. No. 60/660,394, titled "Wireless LAN Array," by Dirk L Gates, Ian Laity, Mick Conley, Mike de la Garrigue, and Steve Smith, filed on Mar. 9, 2005, and incorporated herein by reference; Ser. No. 60/660,209, titled "Wireless LAN Array Architecture," by Dirk I. Gates, Ian Laity, Mick Conley, Mike de la Garrigue, and Steve Smith, filed on Mar. 9, 2005, and incorporated herein by reference; Ser. No. 60/660,393, titled "Antenna Architecture of a Wireless LAN Array," by Abraham Hartenstein, filed on Mar. 9, 2005, and incorporated herein by reference; Ser. No. 60/660,269, titled "Load Balancing In A Multi-Radio Wireless Lan Array Based On Aggregate Mean Levels," by Mick Conley filed on Mar. 9, 2005, and incorporated herein by reference; Ser. No. 60/660,392, titled "Advanced Adjacent Channel Sector Management For 802.11 Traffic," by Mick Conley filed on Mar. 9, 2005, and incorporated herein by reference; Ser. No. 60/660,391, titled "Load Balancing In A Multi-Radio Wireless Lan Array Based On Aggregate Mean Levels," by Shaun Clem filed on Match 9, 2005, and incorporated herein by reference; Ser. No. 60/660,277, titled "System for Transmitting and Receiving Frames in a Multi-Radio Wireless LAN Array," by Dirk L Gates and Mike de la Garrigue, filed on Mar. 9, 2005, and incorporated herein by reference; Ser. No. 60/660,302, titled "System for Allocating Channels in a Multi-Radio Wireless LAN Array," by Dirk I. Gates and Kirk Matthews, filed on Mar. 9, 2005, and incorporated herein by reference; Ser. No. 60/660,376, titled "System for Allocating Channels in a Multi-Radio Wireless LAN Array," by Dirk I. Gates and Kirk Matthews, filed on Mar. 9, 2005, and incorporated herein by reference; Ser. No. 60/660,541, titled "Media Access Controller For Use In A Multi-Sector Access Point Array," by Dirk I. Gates and Mike de la Garrigue, filed on Mar. 9, 2005, and incorporated herein by reference; and is related to PCT patent application, serial number PCT/US2006/009696, titled "Wireless Access Point" fled on Mar. 9; 2006, which claims priority to the above provisional patent applications, and incorporated by reference herein; PCT patent application serial number PCT/US2006/008743, titled "Access Point in a Wireless LAN," filed on Mar. 9, 2006, and incorporated by reference herein; and serial number PCT/US2006/008744, titled "Media Access Controller for use in a Multi-Sector Access Point Array," filed on Mar. 9, 2006, and incorporated by reference herein; PCT patent application serial number PCT/US2006/008698, titled "System for Allocating Channels in a Multi-Radio Wireless LAN Array," filed Mar. 9, 2006, and incorporated by reference herein.

BACKGROUND OF THE INVENTION

1. Field of the Invention

This invention relates generally to communication devices, and more particularly to antennas for media access controllers.

2. Related Art

The use of wireless communication devices for data networking is growing at a rapid pace. Data networks that use "WiFi" ("Wireless Fidelity"), also known as "Wi-Fi," are relatively easy to install, convenient to use, and supported by the IEEE 802.11 standard. WiFi data networks also provide performance that makes WiFi a suitable alternative to a wired data network for many business and home users.

WiFi networks operate by employing wireless access points that provide users, having wireless (or "client") devices in proximity to the access point, with access to varying types of data networks such as, for example, an Ethernet network or the Internet. The wireless access points include a radio that operates according to one of three standards specified in different sections of the IEEE 802.11 specification. Generally, radios in the access points communicate with client devices by utilizing omni-directional antennas that allow the radios to communicate with client devices in any direction. The access points are then connected (by hardwired connections) to a data network system that completes the access of the client device to the data network.

The three standards that define the radio configurations are:
1. IEEE 802.11a, which operates on the 5 GHz frequency band with data rates of up to 54 Mbs;
2. IEEE 802.11b, which operates on the 2.4 GHz frequency band with data rates of up to 11 Mbs; and
3. IEEE 802.11g, which operates on the 2.4 GHz frequency band with data rates of up to 54 Mbs.

The 802.11b and 802.11g standards provide for some degree of interoperability. Devices that conform to 802.11b may communicate with 802.11g access points. This interoperability comes at a cost as access points will switch to the lower data rate of 802.11b if any 802.11b devices are connected. Devices that conform to 802.11a may not communicate with either 802.11b or 802.11g access points. In addition, while the 802.11a standard provides for higher overall performance, 802.11a access points have a more limited range of approximately 60 feet compared with the approximate 300 feet range offered by 802.11b or 802.11g access points.

Each standard defines 'channels' that wireless devices, or clients, use when communicating with an access point. The 802.11b and 802.11g standards each allow for 14 channels. The 802.11a standard allows for 23 channels. The 14 channels provided by 802.11b and 802.11g include only 3 channels that are not overlapping. The 12 channels provided by 802.11a are non-overlapping channels.

Access points provide service to a limited number of users. Access points are assigned a channel on which to communicate. Each channel allows a recommended maximum of 64 clients to communicate with the access point. In addition, access points must be spaced apart strategically to reduce the chance of interference, either between access points tuned to the same channel, or to overlapping channels. In addition, channels are shared. Only one user may occupy the channel at any give time. As users are added to a channel, each user must wait longer for access to the channel thereby degrading throughput.

Another degradation of throughput as the number of clients grow is the result of the use of omni-directional antennas. Unfortunately, current access point technology employs typically one or two radios in close proximity that results in interference, which reduces throughput. In an example of a two radio access point, both radios may be utilized as access points (i.e., each radio communicates with a different client device) or one radio may function as the access point while the other radio functions as a backhaul, i.e., a communication channel from the access point to a network backbone, central site, and/or other access point. Typically, the interference resulting from the different antennas utilized with these radios limits the total throughput available and, as a result, reduces traffic efficiency at the access point.

Unfortunately, in the existing WiFi technologies, there is a need to deploy mesh like networks of access points to increase the coverage area of a WiFi communication system. As the number of access points increases so does the complexity of implementing the communication system. Therefore, there is a need for a radio and antenna architecture capable of operating in a mesh like networks of access points without causing radio interference that reduces the throughput of the network.

SUMMARY

A wireless local area network ("WLAN") antenna array ("WLANAA") is disclosed. The WLANAA may include a circular housing having a plurality of radial sectors and a plurality of primary antenna elements. Each individual primary antenna element of the plurality of primary antenna elements may be positioned within an individual radial sector of the plurality of radial sectors.

The WLANAA may further include a plurality of main reflector elements wherein each main reflector element of the plurality of main reflector elements is located adjacent to each antenna element and a plurality of absorber elements, wherein each absorber element of the plurality of the absorber elements is located between an adjacent pair of primary antenna elements. The WLANAA may also include a plurality of deflector elements wherein each deflector element of the plurality of deflector elements is located adjacent to each primary antenna element.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

FIG. 12A is front view of an etched circuit diagram of an example of an implementation of the individual primary antenna element shown in FIGS. 1, 2, and 3.

FIG. 12B is rear view of an etched circuit diagram of an example of an implementation of the individual primary antenna element shown in FIGS. 1, 2, and 3 and an individual secondary antenna element shown in FIG. 9.

DETAILED DESCRIPTION

In the following description of the preferred embodiment, reference is made to the accompanying drawings that form a part hereof, and which show, by way of illustration, a specific embodiment in which the invention may be practiced. Other embodiments may be utilized and structural changes may be made without departing from the scope of the present invention.

A wireless local area network ("WLAN") antenna array ("WLANAA") is disclosed. The WLANAA may include a circular housing having a plurality of radial sectors and a plurality of primary antenna elements. Each individual primary antenna element of the plurality of primary antenna elements may be positioned within an individual radial sector of the plurality of radial sectors.

In general, the WLANAA is a multi-sector antenna system that has high gain (about 6 dBi) and radiates a plurality of radiation patterns that "carve" up the airspace into equal sections of space or sectors with a certain amount of pattern overlap to assure continuous coverage for a client device in communication with the WLANAA. The radiation pattern overlap may also assistant in managing a plurality of client devices such that adjacent sectors may assist each other in managing the number of client devices served with the highest throughput as controlled by an array controller. The WLANAA provides increased directional transmission and reception gain that allow the WLANAA and its respective client devices to communicate at greater distances than standard omni-directional antenna systems, thus producing an extended coverage area when compared to an omni-directional antenna system.

The WLANAA is capable of creating a coverage pattern that resembles a typical omni-directional antenna system but covers approximately four times the area and twice the range. In general, each radio frequency ("RF") sector is assigned a non-overlapping channel by an Array Controller.

Figure 1:
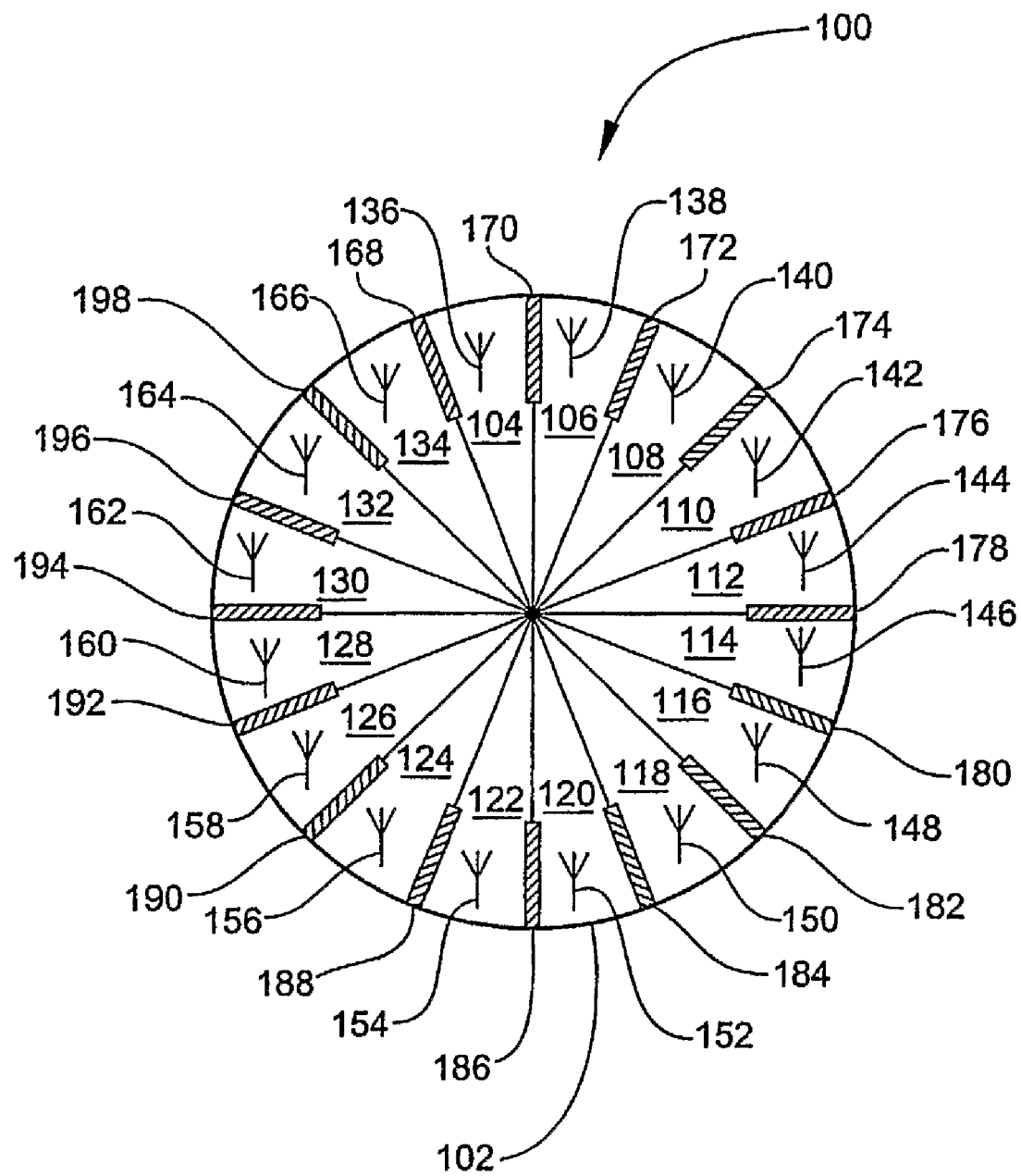
FIG. 1 is a top view of an example of an implementation of a Wireless Local Area Network ("WLAN") Antenna Array ("WLANAA").

In FIG. 1, a top view of an example of an implementation of a WLANAA 100 is shown. The WLANAA 100 may have a circular housing 102 having a plurality of radial sectors. As an example, there may be sixteen (16) radial sectors 104, 106, 108, 110, 112, 114, 116, 118, 120, 122, 124, 126, 128, 130, 132, and 134 within the circular housing 102. The WLANAA 100 may also include a plurality of primary antenna elements (such as, for example, sixteen (16) primary antenna elements 136, 138, 140, 142, 144, 146, 148, 150, 152, 154, 156, 158, 160, 162, 164, and 166). Each individual primary antenna element of the plurality of primary antenna elements may be positioned within an individual radial sector of the plurality of radial sectors such as, for example, primary antenna elements 136, 138, 140, 142, 144, 146, 148, 150, 152, 154, 156, 158, 160, 162, 164, and 166 may be positioned within corresponding radial sectors 104, 106, 108, 110, 112, 114, 116, 118, 120, 122, 124, 126, 128, 130, 132, and 134, respectively. Additionally, each radial sector 104, 106, 108, 110, 112, 114, 116, 118, 120, 122, 124, 126, 128, 130, 132, and 134 may include absorber elements 168, 170, 172, 174, 176, 178, 180, 182, 184, 186, 188, 190, 192, 194, 196, and 198, respectively, that may be positioned between adjacent primary antenna elements 136, 138, 140, 142, 144, 146, 148, 150, 152, 154, 156, 158, 160, 162, 164, and 166. In order to reduce mutual coupling and any potential sidelobes above a certain level resulting from the array factoring of the primary antenna elements 136, 138, 140, 142, 144, 146, 148, 150, 152, 154, 156, 158, 160, 162, 164, and 166, adjacent primary antenna elements are spaced more than a wavelength apart from each other. The absorber elements 168, 170, 172, 174, 176, 178, 180, 182, 184, 186, 188, 190, 192, 194, 196, and 198, may be any material capable of absorbing electromagnetic energy such as, for example, foam-filled graphite-isolated insulators, ferrite elements, dielectric elements, or other similar types of materials.

Each of the primary antenna elements 136, 138, 140, 142, 144, 146, 148, 150, 152, 154, 156, 158, 160, 162, 164, and 166 may be a two element broadside array element such as coupled line dipole antenna element. It is appreciated by those skilled in the art that other types of array elements may also be utilizing including but not limited to a patch, monopole, notch, Yagi-Uda type antenna elements.

Figure 2:
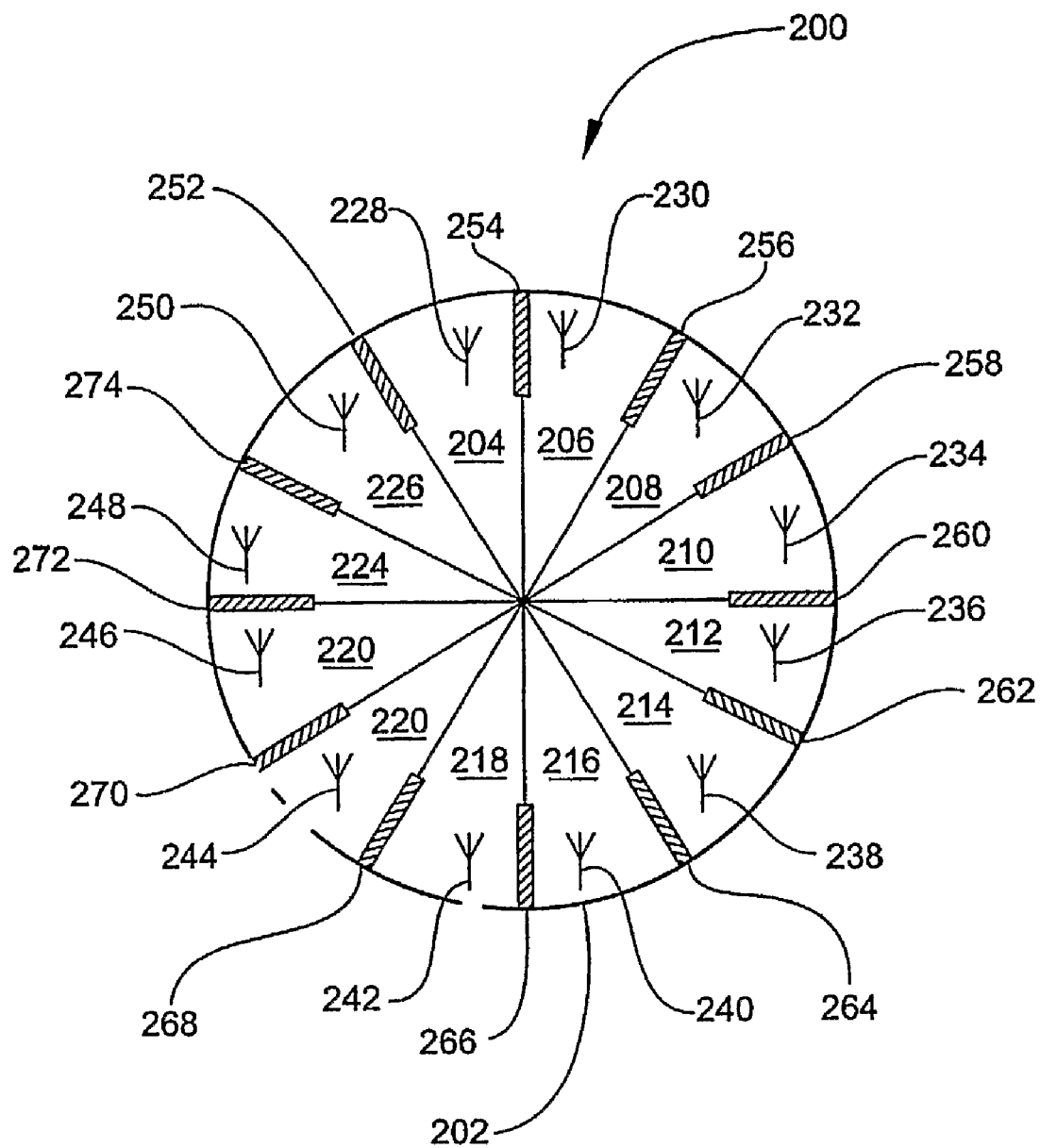
FIG. 2 is a top view of an example of another implementation of a WLANAA utilizing twelve (12) radial sectors.

Similarly in FIG. 2, a top view of an example of another implementation of a WLANAA 200 utilizing twelve (12) radial sectors is shown. The WLANAA 200 may have a circular housing 202 having a plurality of radial sectors 204, 206, 208, 210, 212, 214, 216, 218, 220, 222, 224, and 226. The WLANAA 200 may also include twelve (12) primary antenna elements 228, 230, 232, 234, 236, 238, 240, 242, 244, 246, 248, and 250. Each individual primary antenna element of the plurality of primary antenna elements may be positioned within an individual radial sector of the plurality of radial sectors such as, for example, primary antenna elements 228, 230, 232, 234, 236, 238, 240, 242, 244, 246, 248, and 250 may be positioned within corresponding radial sectors 204, 206, 208, 210, 212, 214, 216, 218, 220, 222, 224, and 226, respectively. Additionally, each radial sector 204, 206, 208, 210, 212, 214, 216, 218, 220, 222, 224, and 226 may include absorber elements 252, 254, 256, 258, 260, 262, 264, 266, 268, 270, 272, and 274, respectively, that may be positioned between adjacent primary antenna elements 228, 230, 232, 234, 236, 238, 240, 242, 244, 246, 248, and 250. In order to reduce mutual coupling and any potential sidelobes above a certain level resulting from the array factoring of the primary antenna elements 228, 230, 232, 234, 236, 238, 240, 242, 244, 246, 248, and 250, adjacent primary antenna elements are spaced more than a wavelength apart from each other. As an example, adjacent primary antenna elements may be spaced two or more wavelengths away from each other. Again, the absorber elements 252, 254, 256, 258, 260, 262, 264, 266, 268, 270, 272, and 274, may be any material capable of absorbing electromagnetic energy such as, for example, foam-filled graphite-isolated insulators, ferrite elements, dielectric elements, or other similar types of materials.

While in FIG. 2 only one individual primary antenna is shown per radial sector, there may also be a plurality of secondary antenna elements present where each individual secondary antenna element may be located in the same radial sector as a primary antenna element.

Figure 3:
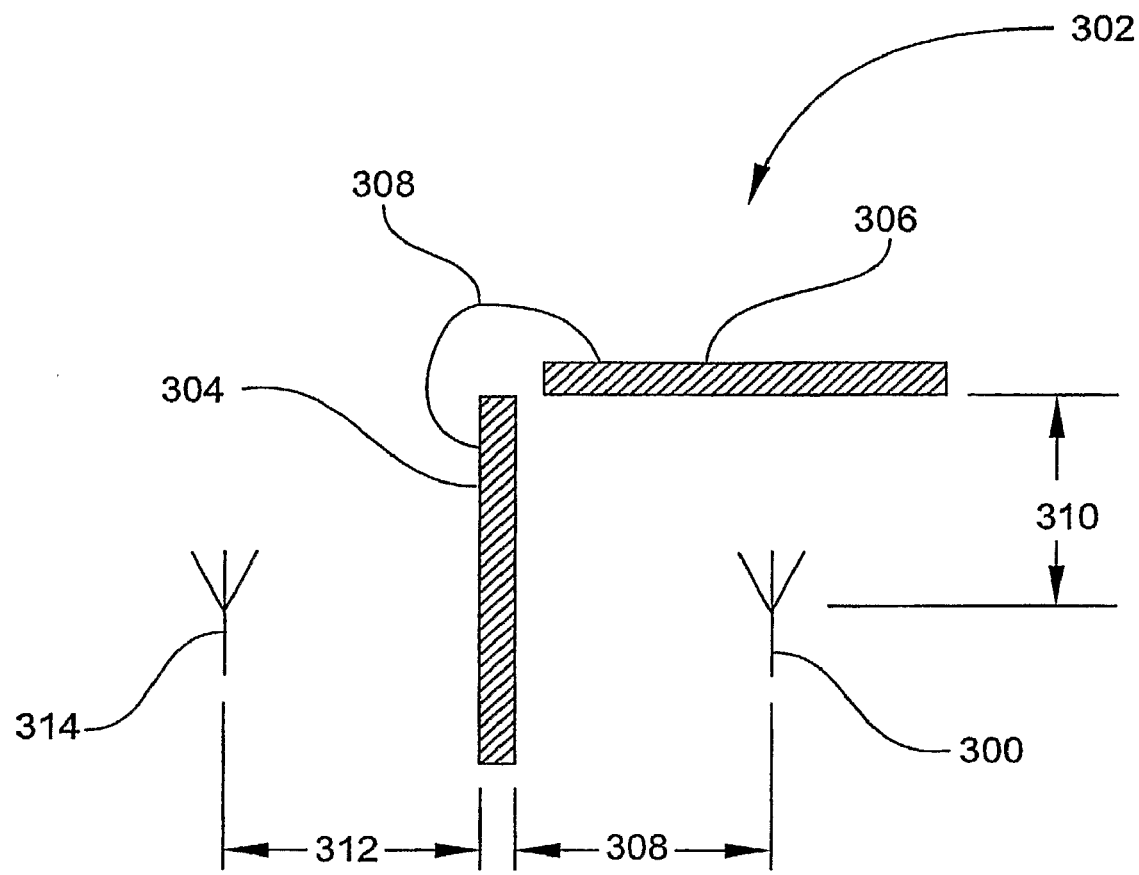
FIG. 3 is a side view of an example of an implementation of an individual primary antenna element within a radial sector shown in FIG. 2.

In FIG. 3, a side view of an example of an implementation of an individual primary antenna element 300 within a single radial sector 302 is shown. The single radial sector 302 may include a main reflector 304 and deflector 306 that may be in signal communication via signal path 308. Both the main reflector 304 and deflector 306 may be constructed from numerous types of conductive material such as, for example, copper, aluminum, gold, nickel, tin, brass, iron, steel, or other types of conductive metal alloys or ceramic-metallic materials, or a combination of these materials.

The primary antenna element 300 may be positioned a reflector distance 308 away from the main reflector 304. The reflector distance 308 may be equal to approximately a quarter wavelength of the frequency of operation of the primary antenna element 300. Similarly, the primary antenna element 300 may be positioned a deflector distance 310 away from the deflector 306. The deflector distance 310 may be equal to approximately a half wavelength of the frequency of operation of the primary antenna element 300. As an example, the primary antenna element may be an IEEE 802.11a antenna element that covers the 5 GHz frequency band and may be implemented as a coupled line dipole antenna array having two or more coupled line dipole elements. As an example for 802.11a, the primary reflector distance 308 may be approximately 0.450 inches (i.e., about a quarter wavelength) and the primary deflector distance 312 may be approximately 0.860 inches (i.e., about a half wavelength).

Figure 7:
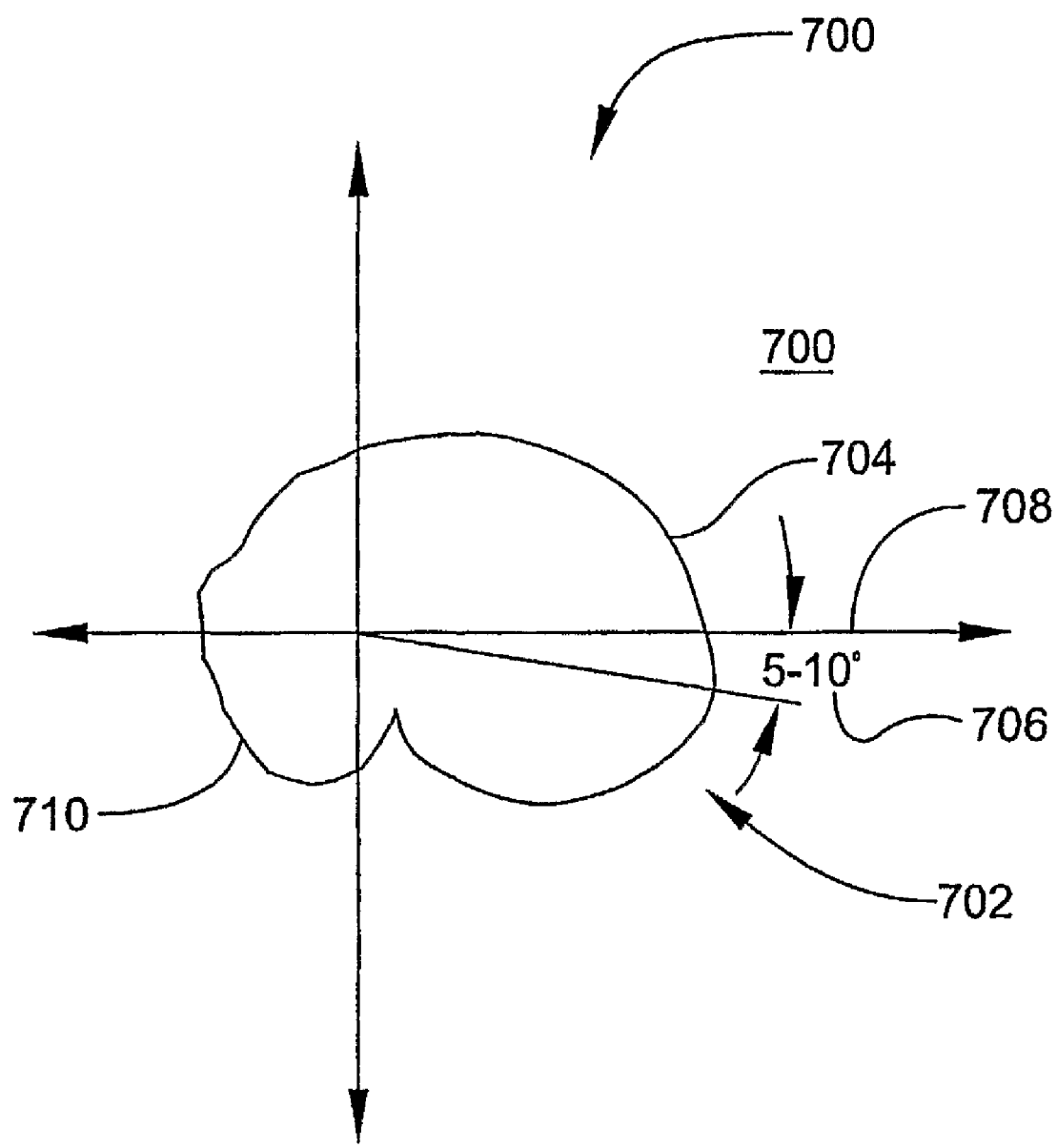
FIG. 7 is a plot of an example of an elevation radiation pattern of the individual primary antenna element in FIG. 4.

Both main reflector 304 and deflector 306 may act as ground planes relative to the primary antenna element 300. The main reflector 304 and deflector 306 focus the energy outwards and below the horizon that is an optimum for near-field and far-field coverage as shown in FIG. 7.

In an example of operation, the main reflector 304 acts as a finite ground plane relative to the primary antenna element 300 to produce a reflector antenna. It is appreciated by those skilled in the art that the reflector antenna produces a radiation pattern that may be determined by utilizing both antenna image theory and the geometric theory of diffraction ("GTD"). Generally, the reflector distance 308 determines the image distance 312 of image 314 of the primary antenna element 300 on the other side of the main reflector 304. From antenna image theory the pattern of the reflector antenna would be equal to $E_θ(θ)=E(θ)\sin(βd \cos(θ))$ plus GTD effects, where E is the electric field radiation pattern in the θ plane (i.e., azimuth or H-plane), β is the phase constant for a plane wave, and d is the reflector distance 308.

According to GTD, the radiation fields produced by the reflector antenna may be divided into three regions (not shown). In the first region in front of the main reflector 304, the radiated field is given by the resultant of the field coming directly from the primary antenna element 300 (the direct field) and the field reflected off the main reflector 304 (the reflected field). In the second region to the sides of the main reflector 304, there is only the direct field from the dipole (i.e., there is no reflection from the main reflector 304) because the second region is in the shadow of the reflected wave but not the direct wave so it may be known as the region of "partial shadow." In the third region behind the main reflector 304, the main reflector 304 acts as an obstacle producing a full shadow with no direct or reflected fields.

Figure 4:
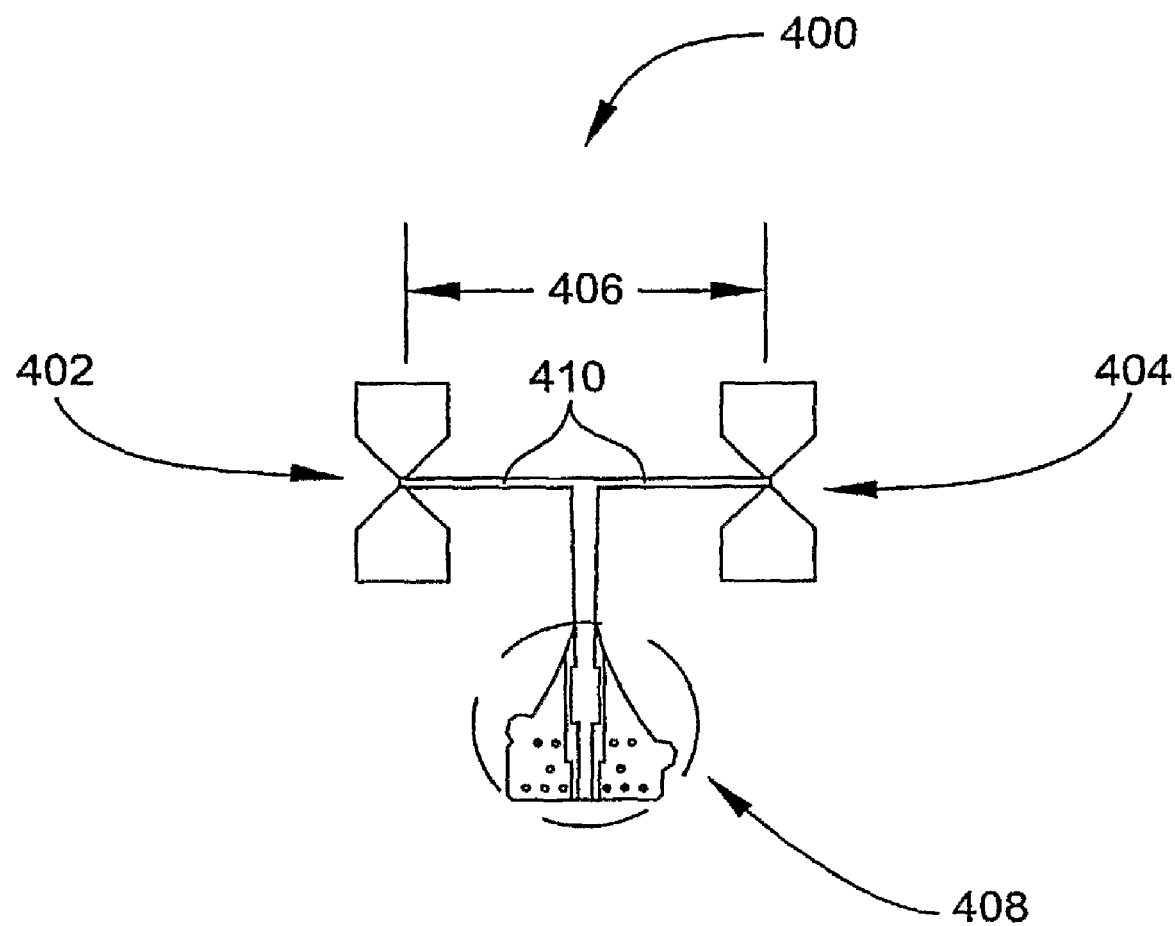
FIG. 4 is an etched circuit diagram of an example of an implementation of the individual primary antenna element shown in FIGS. 1, 2, and 3.

In FIG. 4, an etched circuit diagram of an example of an implementation of the individual primary antenna element 400 is shown. As an example, the primary antenna element 400 may be a patch antenna array that may be etched on a substrate or printed on a printed circuit board ("PCB"). The primary antenna element 400 may be a coupled line dipole antenna array having two coupled line dipole elements 402 and 404. The two coupled line dipole elements 402 and 404 may be spaced 406 approximately half-a-wavelength apart so as to minimize any azimuth sidelobes resulting from the array factor and so as to minimize the coupling between the radial sectors.

A feed network 408 is coupled to the coupled line dipole elements 402 and 404. The feed network 408 is a coupled line that helps in minimizing any parasitic radiation from the feed lines 410. The feed network 408 includes a hybrid-T junction (generally known as a "magic-T") Balun transformer to convert from unbalanced to balanced mode. The magic-T is a three-port device that converts the coupled line feedlines into a single ended microstrip feedline and as a result converts the single ended input (i.e., the microstrip line) into a balanced line with that allows impedance transportation. As an example, the primary antenna element 400 may have a gain value of 6 dB.

In an example of operation as an 802.11a antenna array, the primary antenna element 400 has a spacing between coupled line dipole elements 402 and 404 that is spaced 406 approximately half-a-wavelength apart so as to minimize any azimuth sidelobes resulting from the array factor. This produces sidelobes that are generally lower than about 16 dB from the peak of the main beam of the radiation pattern of the primary antenna element 400 as shown in FIG. 5.

Figure 5:
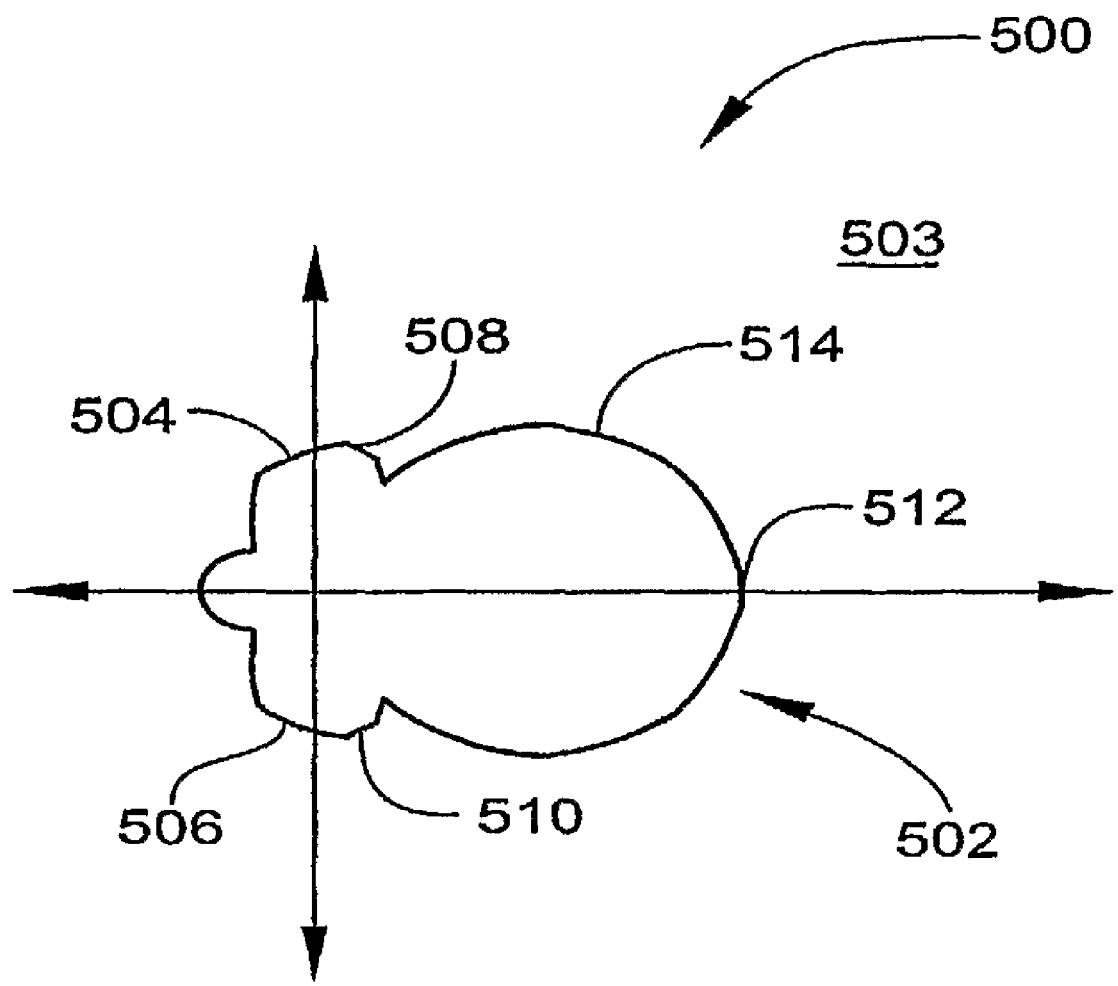
FIG. 5 is a plot of an example of an azimuth radiation pattern of the individual primary antenna element shown in FIG. 4.

In FIG. 5, a plot 500 of an example of an azimuth radiation pattern 502 in the azimuth plane 503 of the individual primary antenna element of FIG. 4 is shown. In this example, the individual primary antenna element is a coupled line dipole antenna array 400 and the spacing between the two coupled line dipole elements 402 and 404 may be spaced 406 approximately half-a-wavelength apart. This produces first sidelobes 504 and 506 that have sidelobe peak values 508 and 510 that are generally lower than about 16 dB from the peak 512 of the main beam 514 of the radiation pattern of the primary antenna element 400.

In an example of operation as an 802.11a antenna array, the primary antenna element spacing between adjacent elements shown in FIGS. 1 and 2 may allow isolation of certain values between primary antenna elements because of the spacing effect between adjacent elements being multiple wavelength in length. This isolation combined with the array factor isolation for the sidelobes created by the primary antenna element combine for a combined isolation of about 40 dB minimum that represents the radial sector isolation between adjacent radial sectors. The absorber elements shown in FIGS. 1 and 2 enhance this radial sector isolation even further for a combined radial sector isolation of about 55 to 65 dB as FIG. 6.

Figure 6:
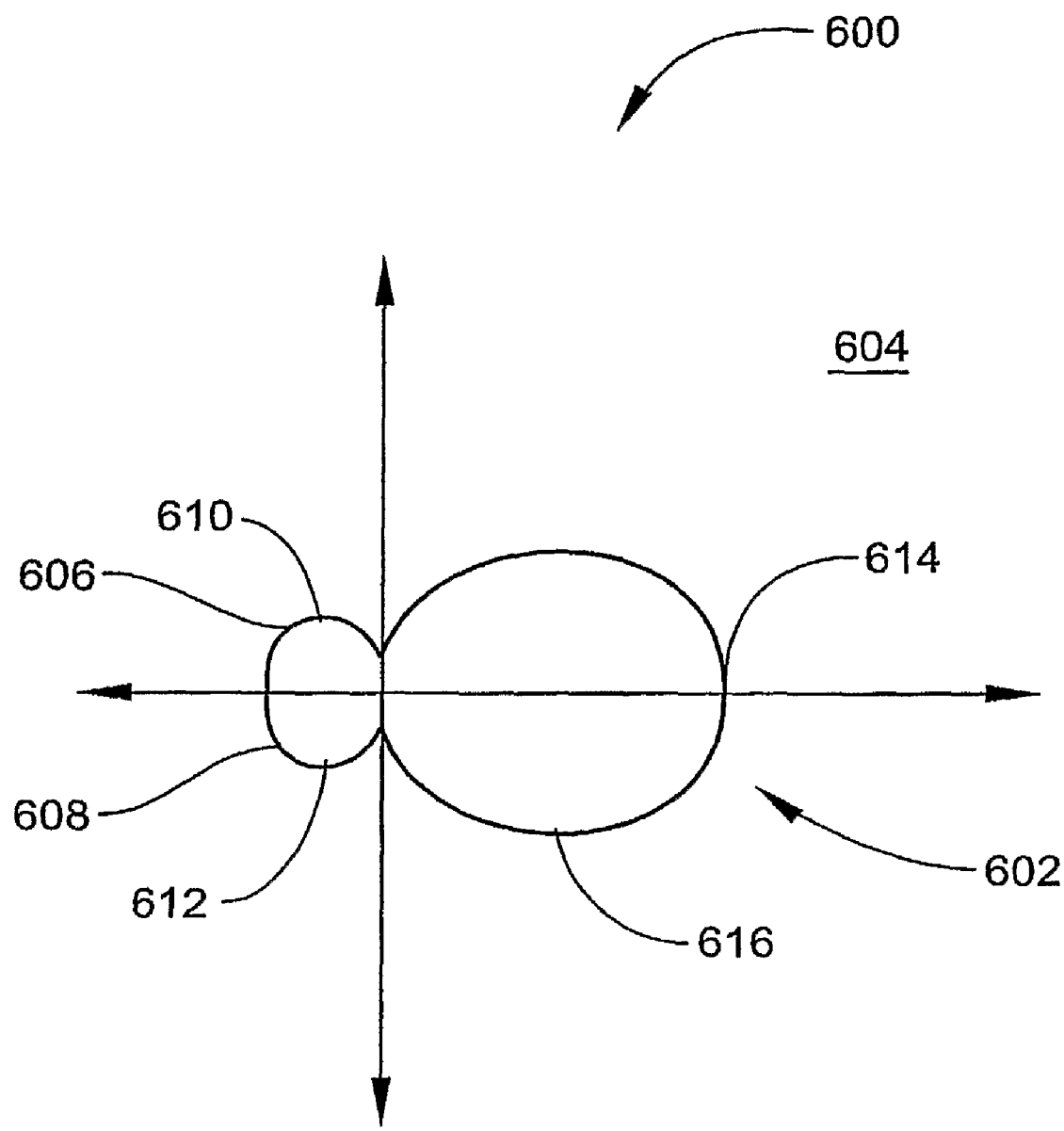
FIG. 6 is a plot of an example of an azimuth radiation pattern of the individual primary antenna element with absorber elements shown in FIG. 4.

In FIG. 6, a plot 600 of an example of an azimuth radiation pattern 602 in the azimuth plane 604 of the individual primary antenna element with the absorber elements of FIGS. 2 and 4 is shown. Similar to FIG. 5, in this example the individual primary antenna element is a coupled line dipole antenna array 400 and the spacing between the two coupled line dipole elements 402 and 404 may be spaced 406 approximately half-a-wavelength apart with absorber elements on both sides of the primary antenna element. This produces first sidelobes 606 and 608 that have sidelobe peak values 610 and 612 that are generally lower than about 24 dB from the peak 614 of the main beam 616 of the radiation pattern 602 of the primary antenna element 400.

In FIG. 7, a plot 700 of an example of an elevation radiation pattern 702 in the elevation plane 704 of the individual primary antenna element of FIGS. 2 and 4 is shown. In an example of operation, the main reflector and the deflector causes the main beam 704 in the elevation pattern 702 to become more directive pointed downward 706 approximately 5 to 10 degrees from the horizontal plane 708. The main reflector helps minimize the backlobe 710 of the antenna.

As described above, in operation the combined radial sector isolation between adjacent radial sectors is about 55 to 65 dB. This combined radial sector isolation increase gradually between non-adjacent radial sectors that are spaced farther apart. Additional improvements to isolation are possible by utilizing different channels on the radios of adjacent radial sectors known as non-overlapping channel isolation. The non-overlapping channel isolation may add another 10 dB or more of isolation for a total isolation between adjacent radial sectors of 75 dB or more.

Figure 8:
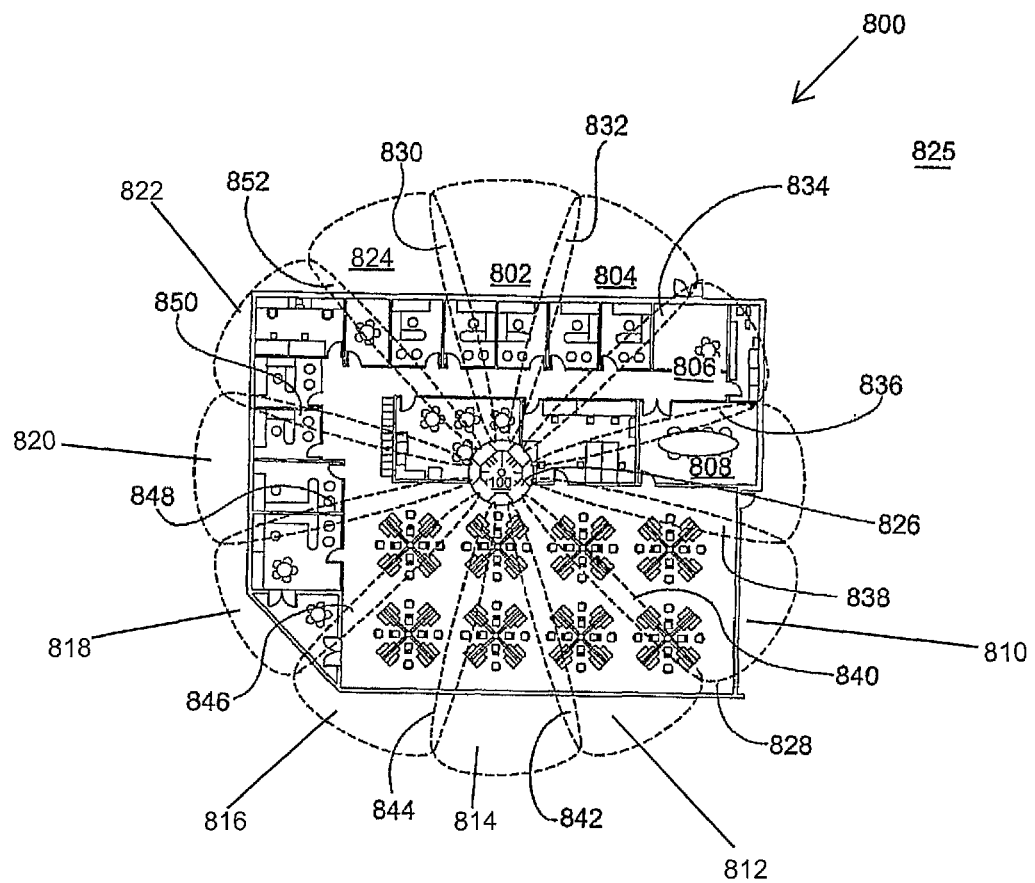
FIG. 8 is a plot of an example of plurality of azimuth radiation patterns of the plurality of primary antenna elements with absorber elements shown in FIG. 2.

In FIG. 8, a plot 800 of an example of plurality of azimuth radiation patterns 802, 804, 806, 808, 810, 812, 814, 816, 818, 820, 822, and 824 in the azimuth plane 825 of the plurality of primary antenna elements within an antenna array 826 with absorber elements of FIG. 2 is shown. In this example, the primary antenna elements may be 802.11a antenna elements. The plurality of azimuth radiation patterns 802, 804, 806, 808, 810, 812, 814, 816, 818, 820, 822, and 824 may provide coverage for an example floor plan 828 of an office space. The radiation patterns 802, 804, 806, 808, 810, 812, 814, 816, 818, 820, 822, and 824 may overlap with adjacent radiation pattern at pattern overlaps 830, 832, 834, 836, 838, 840, 842, 844, 846, 848, 850, and 852. The radiation patterns may overlap to allow client devices (not shown) to move between areas covered by adjacent radial sectors without losing communication.

In FIG. 9A, an etched circuit diagram of an example of an implementation of an individual secondary antenna element is shown. As an example, the secondary antenna element may be an IEEE 802.11b or 802.11g antenna element that covers the 2,400 to 2,483 MHz range and may be implemented as a bent monopole antenna 900 or a two element array of bent monopoles antenna elements 902 and 904 as shown in FIG. 9B. The secondary antenna element may be either etched on a substrate or printed on a PCB.

As shown in FIG. 9C, the secondary antenna element 906 may be positioned a secondary reflector distance 908 from the main reflector 910 and a secondary deflector distance 912 from the deflector 914. Similar to FIG. 3, the main reflector 910 and deflector 914 may be in signal communication via signal path 916. As an example for 802.11b or 802.11g, the secondary reflector distance 908 may be approximately 0.450 inches and the secondary deflector distance 912 may be 1.30 inches. Utilizing these values secondary antenna element may have a gain value of 2 dB in FIG. 9A and 4 dB in FIG. 9B. Additionally, the coverage varies between the secondary antenna elements shown in FIGS. 9A and 9B. In FIG. 9A, the single bent monopole 900 may have, as an example, a 3 dB azimuth beamwidth of approximately 90 degrees while the dual bent monopole 902 and 904 antenna array of FIG. 9B may have a 3 dB azimuth beamwidth of approximately 50 degrees.

Similar to FIG. 3, both main reflector 910 and deflector 914 may act as ground planes relative to the secondary antenna element 906. The main reflector 910 and deflector 912 focus the energy outwards and below the horizon that is an optimum for near-field and far-field coverage. In general, the secondary antenna element 906 is not influenced by the absorber elements (not shown) because the absorber elements have a thickness that has been optimized to attenuate radiation from the primary antenna elements.

Figure 10:
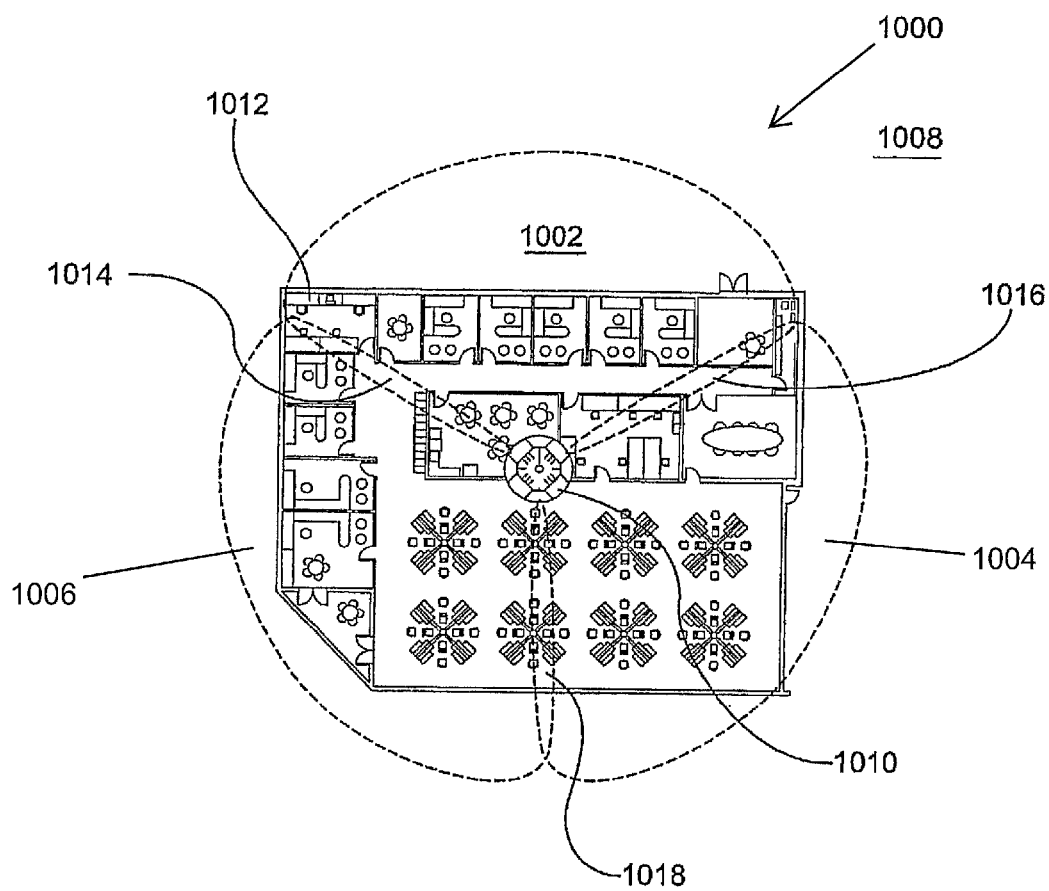
FIG. 10 is a plot of an example of a plurality of azimuth radiation patterns of the plurality of secondary antenna elements.

In FIG. 10, a plot 1000 of an example of plurality of azimuth radiation patterns 1002, 1004, and 1006 in the azimuth plane 1008 of the plurality of secondary antenna elements within an antenna array 1010 is shown. In this example, the secondary antenna elements may be 802.11b or 802.11g antenna elements. The plurality of azimuth radiation patterns 1002, 1004, and 1006 may provide coverage for an example floor plan 1012 of an office space. The radiation patterns 1002, 1004, and 1006 may overlap with adjacent radiation patterns at pattern overlaps 1014, 1016, and 1018. The radiation patterns may overlap to allow client devices (not shown) to move between areas covered by adjacent radial sectors without losing communication.

Figure 11:
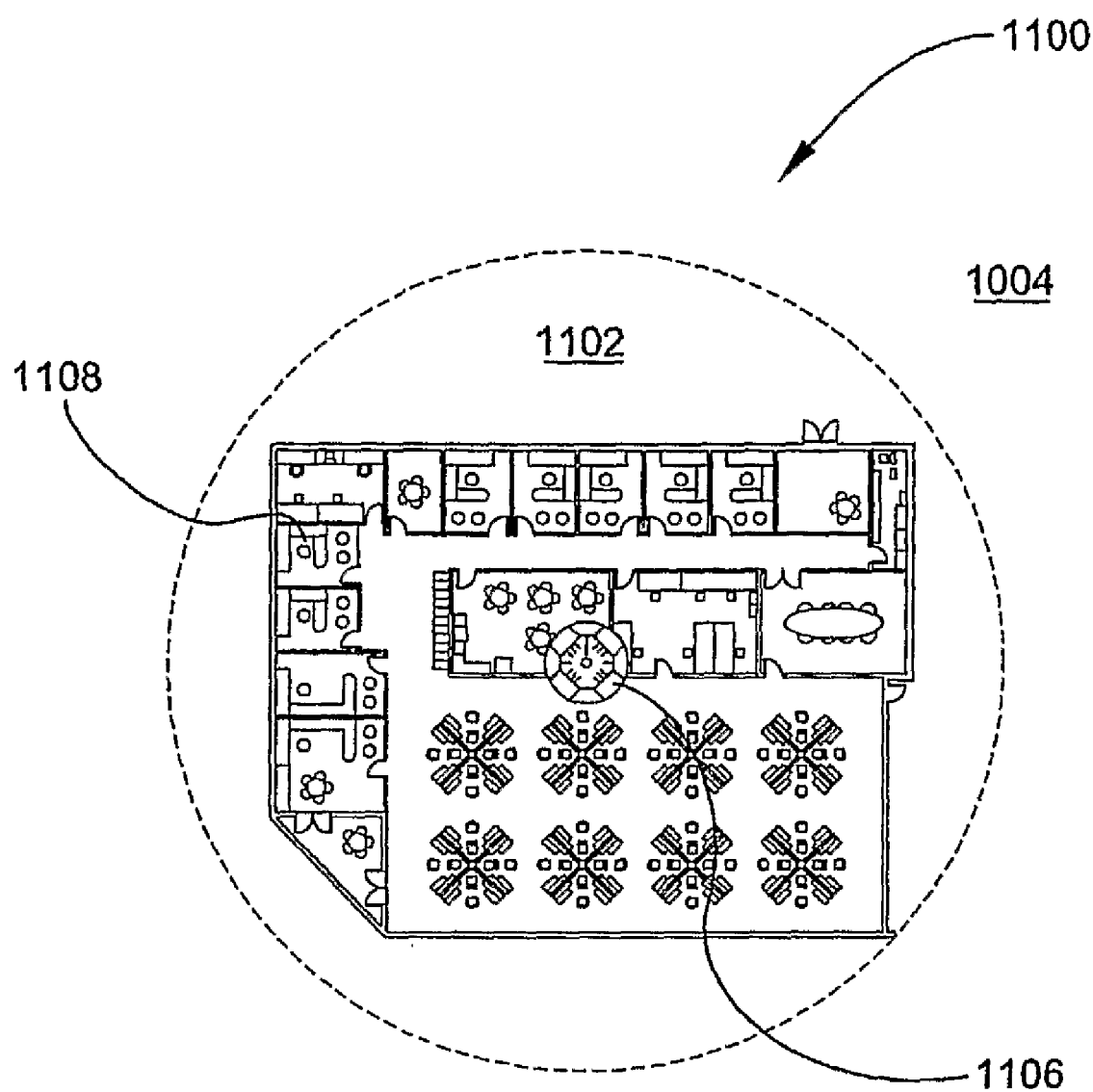
FIG. 11 is a plot of an example of an azimuth radiation pattern of an individual secondary antenna element in a listening mode.

In FIG. 11, a plot 1100 of an example of an azimuth radiation pattern 1102 in the azimuth plane 1104 of an individual secondary antenna element 1106 in a listening mode is shown. In this example, the secondary antenna element 1106 may be an 802.11b or 802.11g antenna element. The azimuth radiation pattern 1102 may be an omni-direction radiation pattern that provides coverage for an example floor plan 1108 of an office space.

Figure 9:
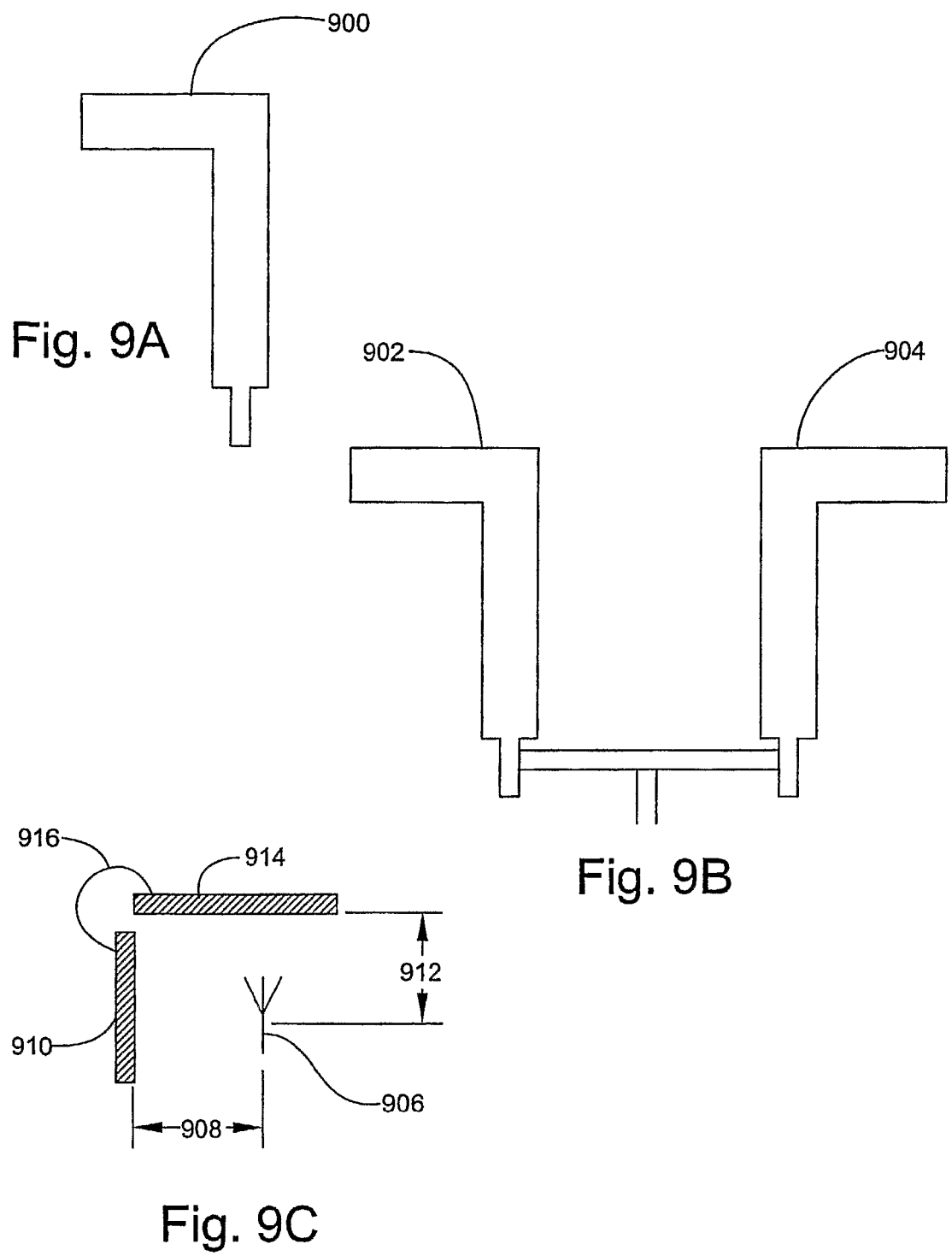
FIG. 9A is an etched circuit diagram of an example of an implementation of an individual secondary antenna element.
FIG. 9B is an etched circuit diagram of an example of an implementation of two secondary antenna elements.
FIG. 9C is a side view of an example of an implementation of an individual secondary antenna element within a radial sector shown in FIG. 2.

In FIG. 12A, a front view of an etched circuit diagram of an example of an implementation of the individual primary antenna element of FIGS. 1, 2, and 3 is shown. In FIG. 12B, a rear view of an etched circuit diagram of an example of an implementation of the individual primary antenna element of FIGS. 1, 2, and 3 and an individual secondary antenna element of FIG. 9 is shown.

Similar to FIG. 4, in this example the primary antenna element may be a patch antenna array that may be etched on a one layer substrate or printed on a layer of a PCB. The primary antenna element may be coupled line dipole antenna array having two coupled line dipole elements. The two coupled line dipole elements may be spaced 1200 approximately half-a-wavelength apart so as to minimize any azimuth sidelobes resulting from the array factor and so as to minimize the coupling between the radial sectors.

In FIGS. 12A and 12B, the coupled line dipole is shown in two parts that include a backplane part 1202 and a front-plane part 1204. The backplane part 1202 may be etched on a back layer of a substrate or printed on the backside of a PCB while the front-plane part 1204 may be a microstrip fed dipole that is etched on a front layer of the substrate or printed on the front-plane of the PCB along with a magic-T feed network 1206. When combined, the backplane part 1202 and front-plane part 1204 act as a complete coupled line dipole as previously described in FIG. 4.

Figure 13:
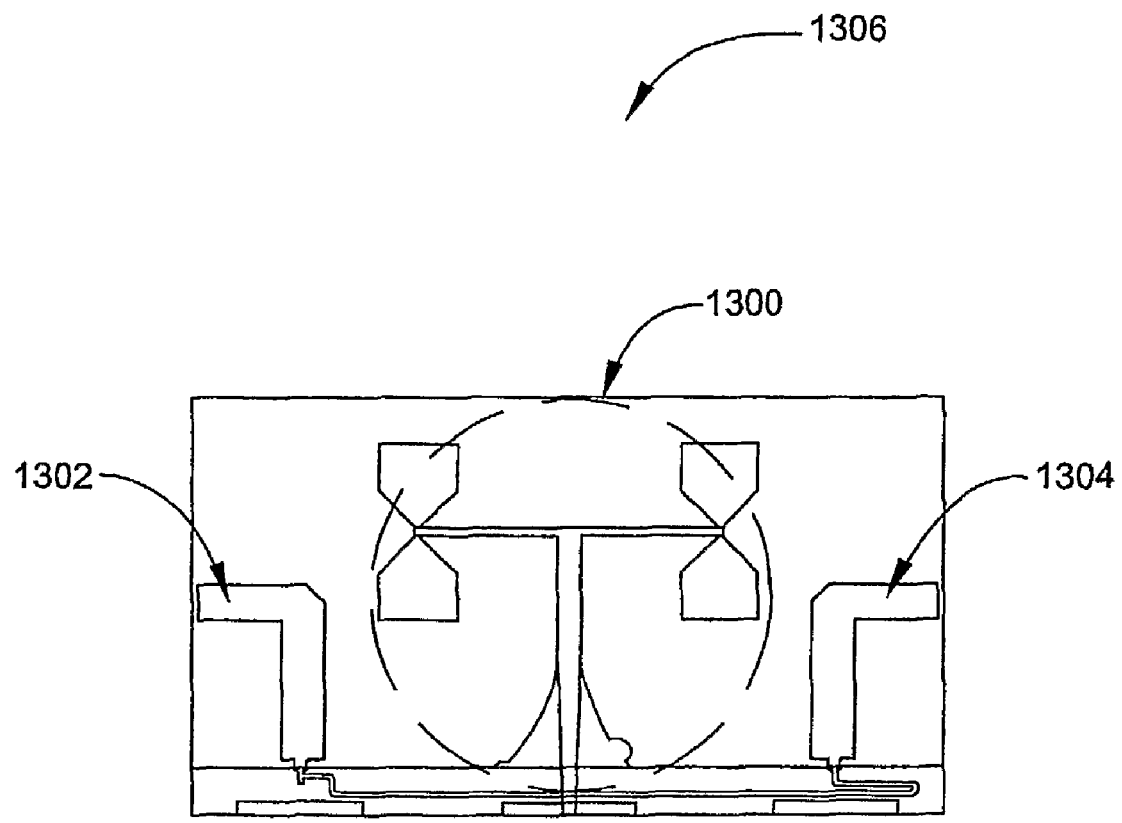
FIG. 13 is an etched circuit diagram of an example of another implementation of the individual primary antenna element and two secondary antenna elements in an array form.

In FIG. 12B, a secondary antenna element 1208 is also shown. The secondary antenna element 1208 may be a single bent monopole antenna as described in FIGS. 9A, 9B, and 9C or a two bent monopole array as shown in FIG. 13. In an example of operation, if the primary antenna element is an 802.11a antenna element and the secondary antenna element is an 802.11b or 802.11g antenna element, the primary antenna element does not interfere with the secondary antenna element and vise-versa.

In FIG. 13, an etched circuit diagram of an example of another implementation of the individual primary antenna element 1300 and two secondary antenna elements 1302 and 1304 in a single radial sector 1306 is shown. By adding another bent monopole antenna 1304 in the radial sector 1306 that is arrayed with the first bent monopole antenna 1302 the 802.11b or 802.11g antenna directivity may be increase from 2 dBi (for a single bent monopole) to about 4 dBi. This configuration does not interfere with the 802.11a antenna 1300.

Figure 14:
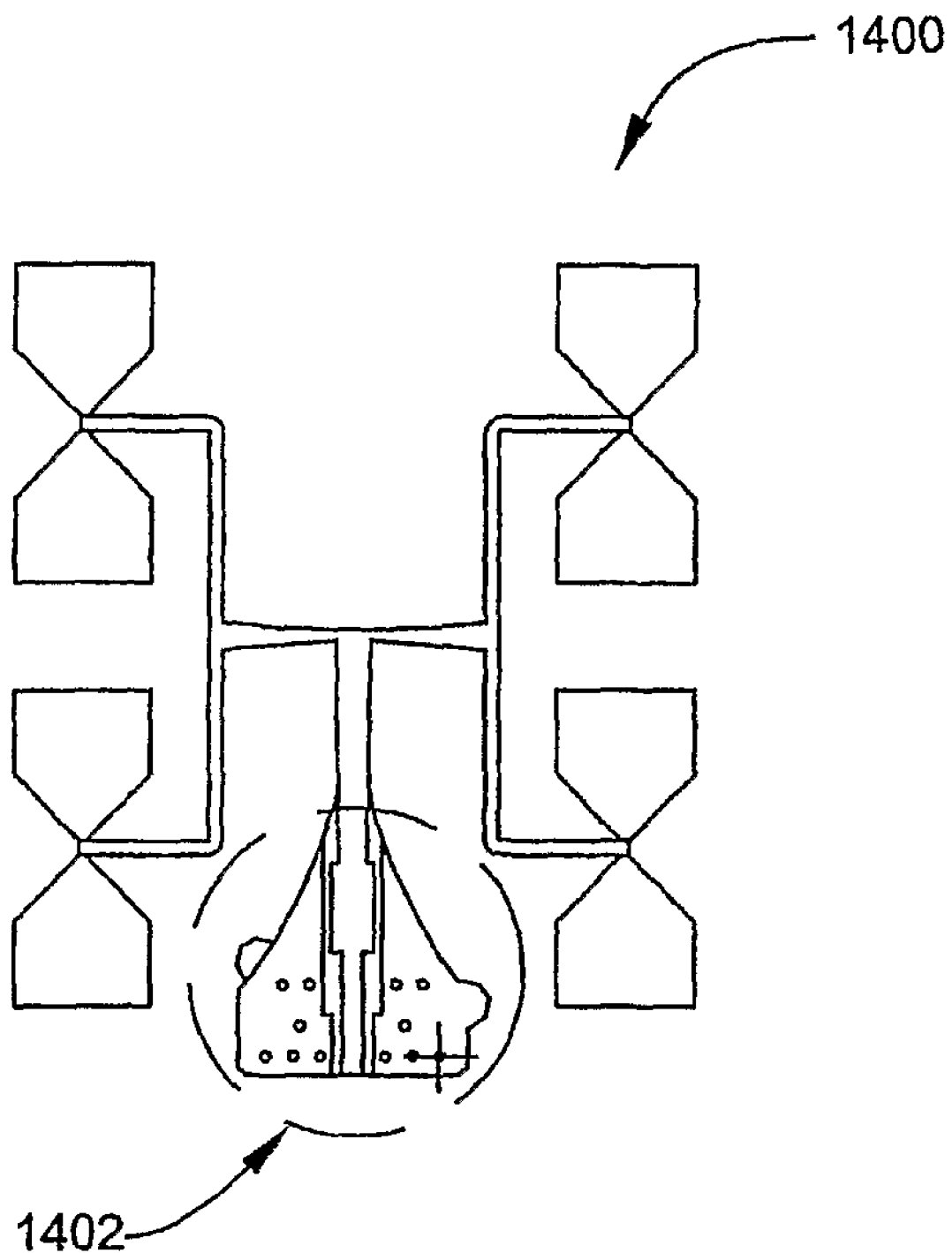
FIG. 14 is an etched circuit diagram of an example of another implementation of the individual primary antenna element shown in FIGS. 1, 2, and 3.

In FIG. 14, an etched circuit diagram of an example of another implementation of the individual primary antenna element 1400 of FIGS. 1, 2, and 3 is shown. Instead of a two dipole array, as shown in FIG. 4, the primary antenna element in FIG. 14 includes four dipoles fed by a magic-T feed network 1402. The result of this configuration is a narrower elevation radiation beam that the deflector directs away from horizontal direction. The deflector also increases further the isolation with radial sectors on the opposite side of the WLANAA.

Figure 15:
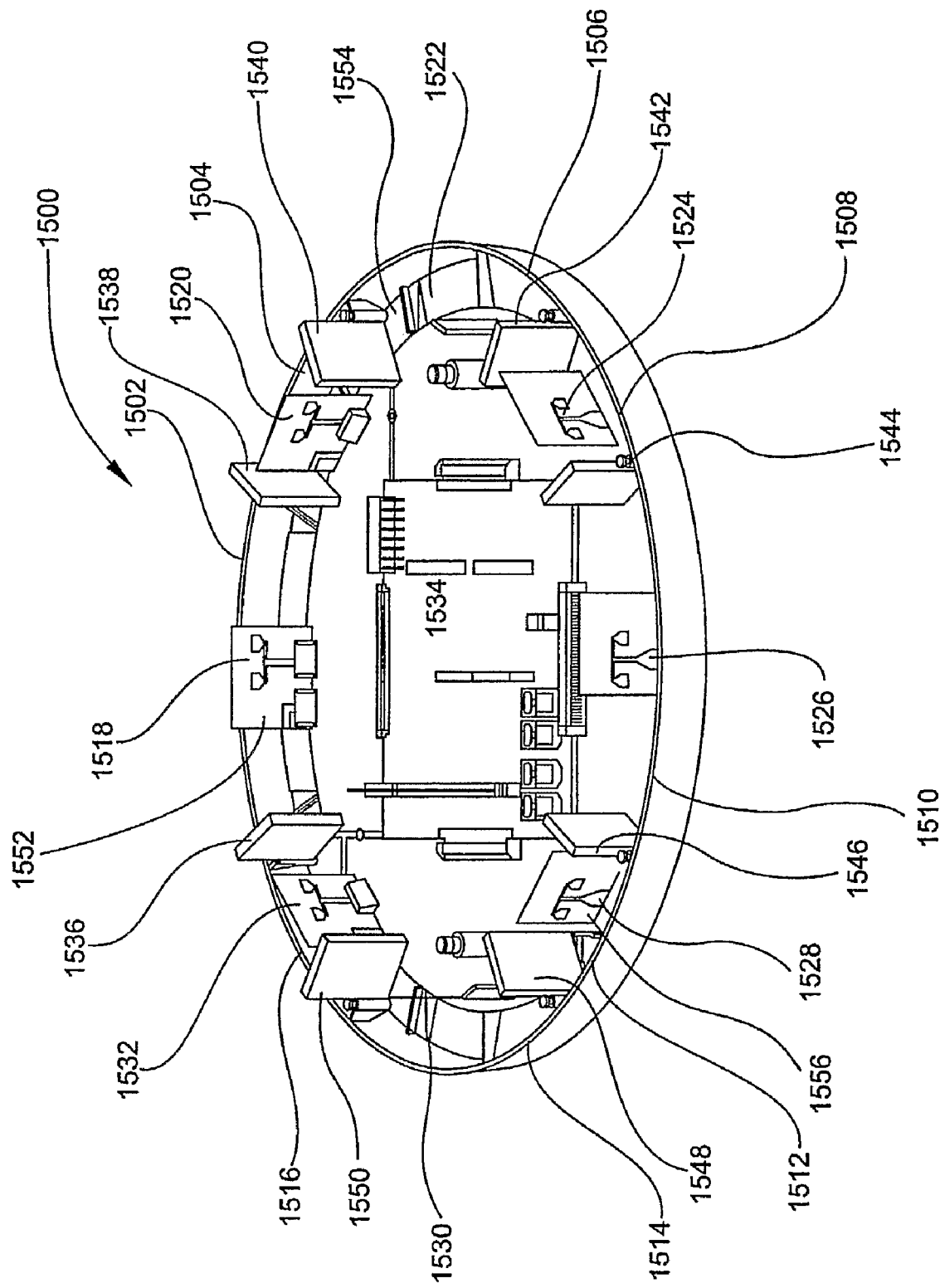
FIG. 15 is prospective view of an example of another implementation of a WLANAA utilizing eight (8) radial sectors.

In FIG. 15, a prospective view of an example of another implementation of a WLANAA 1500 utilizing eight (8) radial sectors 1502, 1504, 1506, 1508, 1510, 1512, 1514, and 1516 is shown. The WLANAA 1500 includes eight primary antenna elements 1518, 1520, 1522, 1524, 1526, 1528, 1530, and 1532 in signal communication with an array controller 1534. The WLANAA 1500 also includes absorber elements 1536, 1538, 1540, 1542, 1544, 1546, 1548, and 1550 and secondary antenna elements 1552, 1554, and 1556. In this example, the main reflector (not shown) may be a circular conducting cylinder, or ring, that fits concentrically within the WLANAA 1500.

Figure 16:
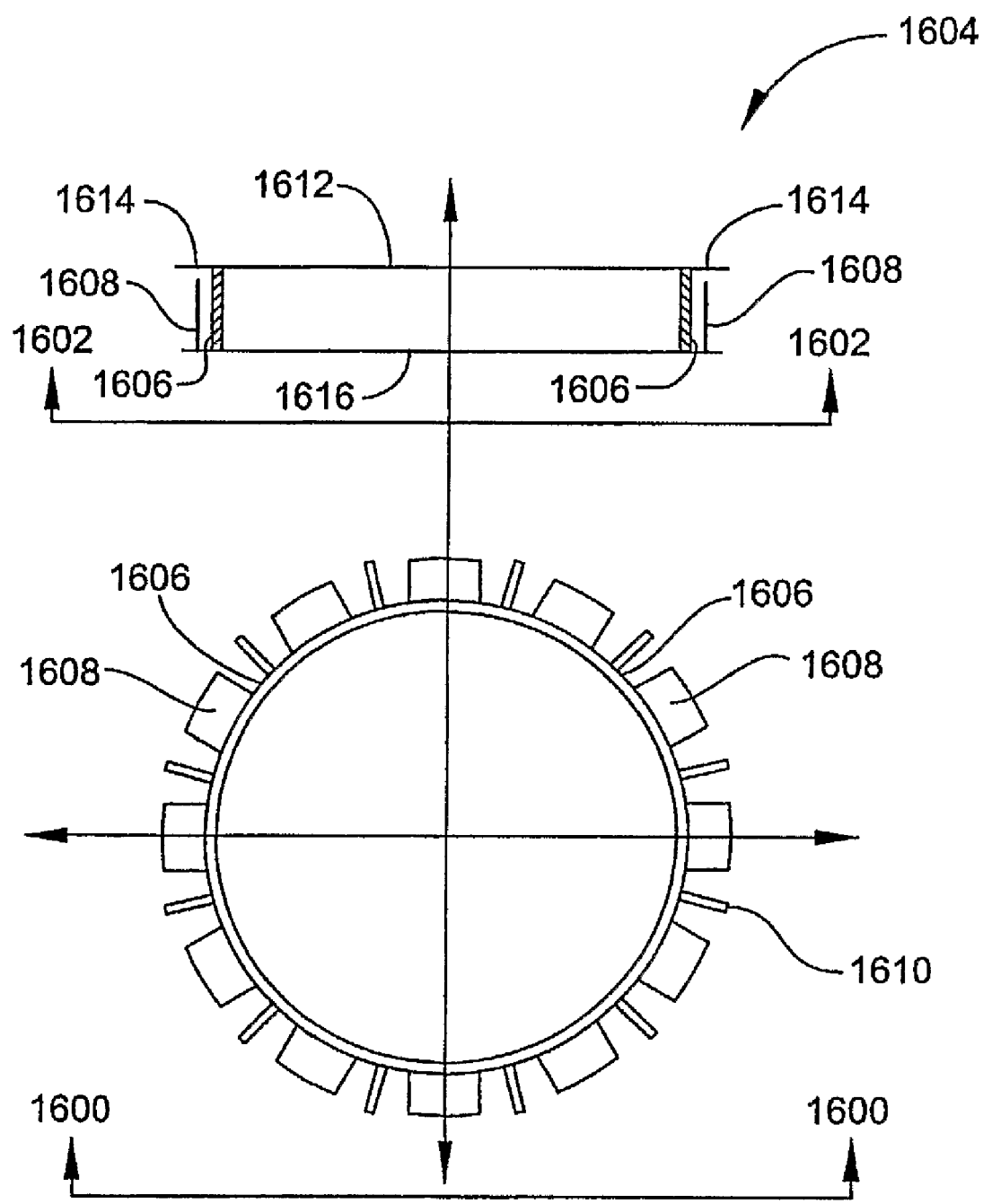
FIG. 16 is a top-view and side-view of the WLANAA.

In FIG. 16, a top-view 1600 and side-view 1602 of the WLANAA 1604 is shown. As referred to above, in this example the main reflector 1606 may be a circular conducting cylinder, or ring, that fits concentrically within the WLANAA 1604 behind the antenna elements 1608 within the plurality of radial sectors. The antenna elements 1608 may be primary antenna elements or a combination of primary and secondary antenna elements as described above. The plurality of absorber elements 1610 are shown as located between the antenna elements 1608 of the plurality of radial sectors. The deflector is also shown as either continuous sheet 1612 of conductive material that is parallel to a ceiling or as discontinuous deflector elements 1614 that only extend from the main reflector 1606 and over the antenna elements 1608. Alternatively, instead of being discontinuous, the deflector 1614 may also be a flat circular ring that extends from the main reflector 1606 and over the antenna elements 1608.

Figure 17:
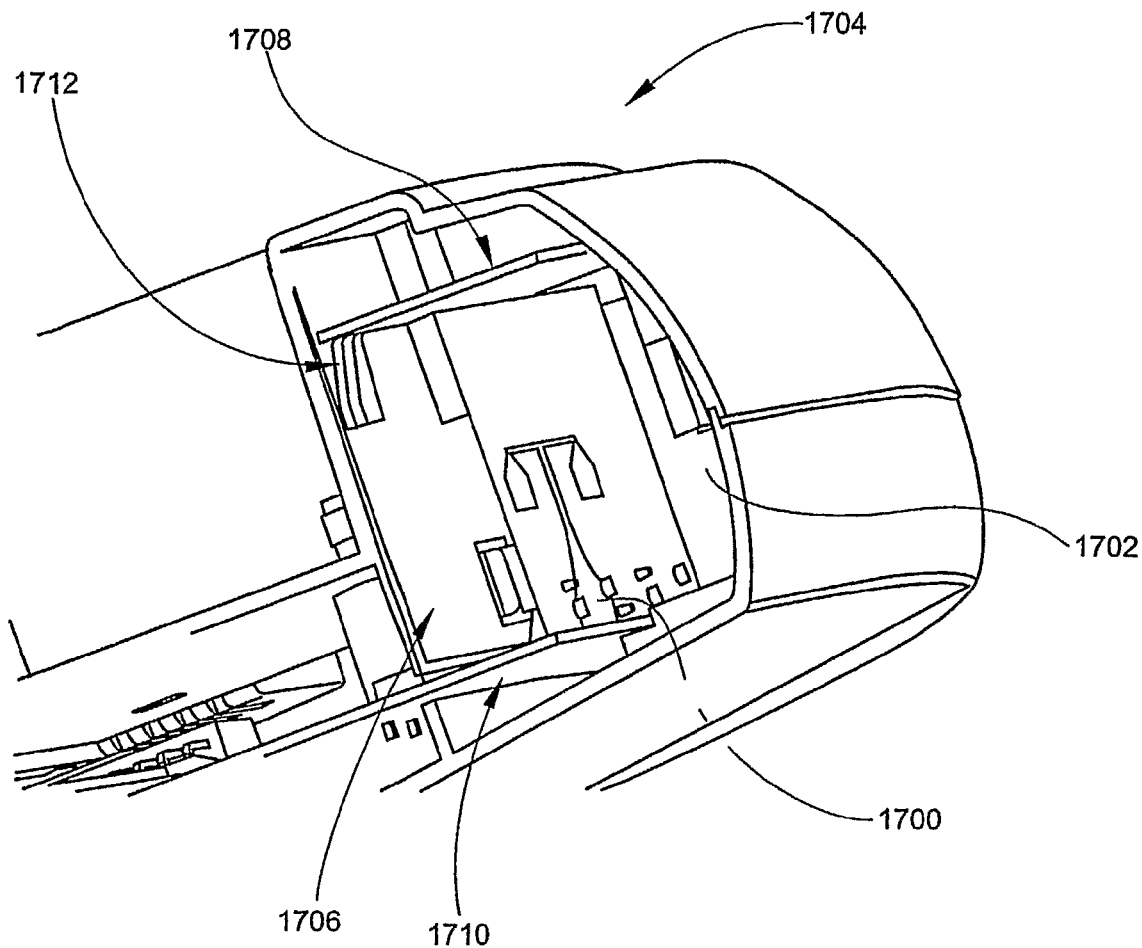
FIG. 17 is a cut-view of an example of an implementation of an individual primary antenna element shown in FIGS. 1, 2, and 3 in an individual radial sector.

In FIG. 17, a cut-view of an example of an implementation of an individual primary antenna element 1700 of FIGS. 1, 2, and 3 in an individual radial sector 1702 of the WLANAA 1704 is shown. The radial sector 1702 includes the main reflector 1706, deflector 1708, and a secondary ground plane 1710. As an example, the main reflector 1706 and deflector 1708 may be in signal communication via signal path 1712 that may be a bonded wire or other ground type connection.

Figure 18:
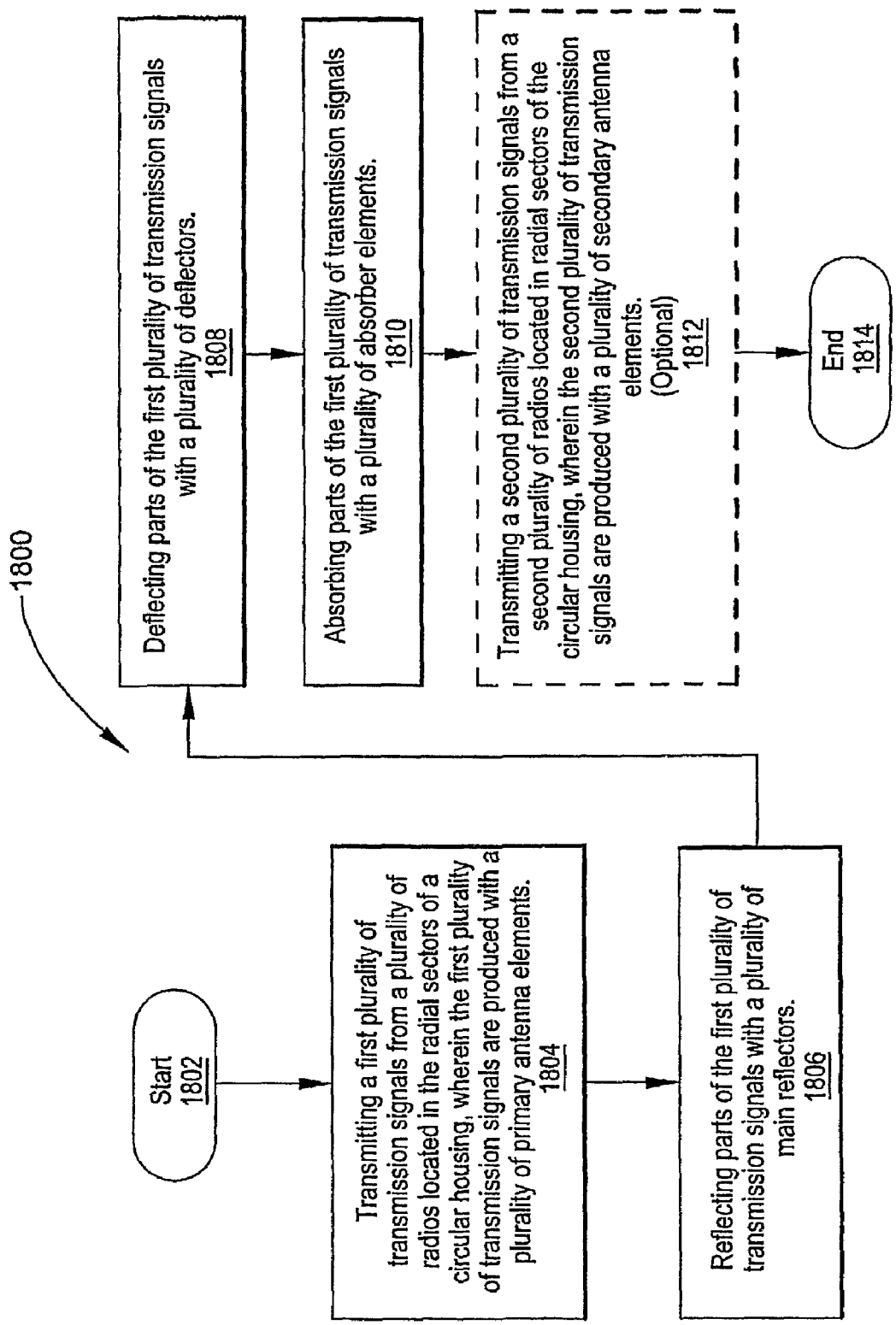
FIG. 18 is a flowchart showing an example of an implementation of process performed by the WLANAA.

In FIG. 18, a flowchart 1800 showing an example of an implementation of process performed by the WLANAA is shown. The process begins in step 1802 and in step 1804 the WLANAA transmits a first plurality of transmission signals from a plurality of radios located in the radial sectors of a circular housing, wherein the first plurality of transmission signals are produced with a plurality of primary antenna elements. In step 1806, the WLANAA reflects parts of the first plurality of transmission signals with a plurality of main reflectors. It is appreciated that the main reflector may include a plurality of main reflectors elements or, alternatively, may be one continuation main reflector 1606 as shown in FIG. 16. In step 1808, the WLANAA deflects parts of the first plurality of transmission signals with a plurality of deflectors. Again, it is appreciated that the deflector may include a plurality of main reflectors elements or, alternatively, may be one continuation deflector plate 1612 or ring 1614 as shown in FIG. 16. The WLANAA then absorbs parts of the first plurality of transmission signals with a plurality of absorber elements in step 1810. The method then includes optionally, in step 1812, transmitting a second plurality of transmission signals from a second plurality of radios located in radial sectors of the circular housing, wherein the second plurality of transmission signals are produced with a plurality of secondary antenna elements. The process then ends in step 1814.

Moreover, it will be understood that the foregoing description of numerous implementations has been presented for purposes of illustration and description. It is not exhaustive and does not limit the claimed inventions to the precise forms disclosed. Modifications and variations are possible in light of the above description or may be acquired from practicing the invention. The claims and their equivalents define the scope of the invention.

What is claimed:

1. A method for radiating multiple antenna patterns in a wireless local area network ("WLAN") antenna array ("WLANAA"), the method comprising:
transmitting a first plurality of transmission signals from a plurality of radios located in radial sectors of a circular housing, wherein the first plurality of transmission signals are produced with a plurality of primary antenna elements;
reflecting parts of the first plurality of transmission signals with a plurality of main reflectors;
deflecting parts of the first plurality of transmission signals with a plurality of deflectors; and
absorbing parts of the first plurality of transmission signals with a plurality of absorber elements.

2. The method of claim 1, wherein transmitting includes transmitting utilizing non-overlapping channels.

3. The method of claim 2, wherein transmitting includes transmitting the first plurality of transmission signals that conform to the IEEE 802.11a frequency standard.

4. The method of claim 3, wherein transmitting includes transmitting the first plurality of transmission signals,
wherein individual transmission signals from the first plurality of transmission signals have individual radiation patterns, and
wherein the individual radiation patterns overlap for corresponding individual primary antenna elements, of the plurality of primary antenna elements, that are located adjacent to each other.

5. The method of claim 4, further including transmitting a second plurality of transmission signals from a second plurality of radios located in radial sectors of the circular housing, wherein the second plurality of transmission signals are produced with a plurality of secondary antenna elements.

6. The method of claim 5, wherein transmitting includes transmitting utilizing non-overlapping channels.

7. The method of claim 6, wherein transmitting includes transmitting the second plurality of transmission signals that conform to the IEEE 802.11b frequency standard.

8. The method of claim 7, wherein transmitting a second plurality of transmission signals includes transmitting the second plurality of transmission signals,
wherein individual transmission signals from the second plurality of transmission signals have individual secondary radiation patterns, and
wherein the individual secondary radiation patterns overlap for corresponding individual secondary antenna elements, of the plurality of secondary antenna elements, that are located adjacent to each other.

9. The method of claim 6, wherein transmitting includes transmitting the second plurality of transmission signals that conform to the IEEE 802.11g frequency standard.

10. The method of claim 9, wherein transmitting a second plurality of transmission signals includes transmitting the second plurality of transmission signals,
wherein individual transmission signals from the second plurality of transmission signals have individual secondary radiation patterns, and
wherein the individual secondary radiation patterns overlap for corresponding individual secondary antenna elements, of the plurality of secondary antenna elements, that are located adjacent to each other.

* * * * *